Aug. 16, 1932.    H. SWAN ET AL    1,871,568

PRINTING PLATE AND METHOD OF MANUFACTURING IT

Filed Nov. 15, 1929

INVENTORS:
Hylton Swan & Sigfried Higgins.
BY
ATTORNEYS.

Patented Aug. 16, 1932

1,871,568

UNITED STATES PATENT OFFICE

HYLTON SWAN, OF UPPER MONTCLAIR, AND SIGFRIED HIGGINS, OF VERONA, NEW JERSEY, ASSIGNORS TO BAKELITE CORPORATION, OF NEW YORK, N. Y., A CORPORATION OF DELAWARE

PRINTING PLATE AND METHOD OF MANUFACTURING IT

Application filed November 15, 1929. Serial No. 407,563.

This invention relates to printing plates molded from phenolic resinoid compositions and to methods of making them. Molding compositions of this type are in general obtained by incorporating a filler such as woodflour, asbestos fibre, blotting paper, etc. with a resinoid binder, that is, a resinous condensation product resulting from the condensation of a phenol and formaldehyde, or their equivalents, and characterized by an initial fusible condition customarily called reactive for the reason that the application of heat during a molding operation causes a transformation to a final infusible condition.

It is known that printing plates of superior merit in many respects can be molded from phenolic resinoid compositions. For instance, plates so made possess durability, permanence and resistance to acids and the usual solvents, and are also light in weight so that they can be readily mailed or otherwise transported. They are, however, apt to be deficient in shock resistance to the extent that if a plate is accidentally struck while mounted on a press it is liable to crack and fragments of the broken plate to fall on adjacent forms and become wedged between the press cylinders, thereby causing damage not only to the plate itself but to the adjacent matter.

According to the present invention brittleness or lack of shock resistance of plates molded from phenolic or equivalent resinoid compositions is compensated or substantially nullified by communicating resiliency to the plate structure in such a manner that the danger of breakage and the falling out of broken sections is minimized or obviated. This is accomplished by the addition to a printing plate section so prepared of a resilient backing that does not penetrate but adheres thereto with such firmness as to resist separation. Backing material found suitable for this purpose is sheet rubber of thin section which may be reinforced or strengthened by the inclusion of suitable fabric or otherwise. In addition to imparting shock resistance it is found that the use of a backing of this nature is attended with other unexpected advantages hereinafter set forth which appear both in the molding operation and in the final product.

In the usual procedure of making plates from resinoid compositions the composition in reactive condition is placed upon a matrix that has been prepared from the original type form, half-tone engraving, etc. to be reproduced, and the assembly is submitted to pressure between the flat platens of a press. At the same time heat is applied to cause a softening or fusing of the composition which under the applied pressure flows into intimate contact with all portions of the surface of the matrix. Continued heating sets the resinoid composition to its infusible condition. In this operation pressures ranging from 1000 to 2500 pounds per square inch are as a rule required with temperatures ranging from 300 to 350° F.

Embodiments illustrative of the invention are shown in section and on an enlarged scale in the accompanying drawing in which Fig. 1 shows a resinoid composition plate with a backing of rubber;

Figure 1:
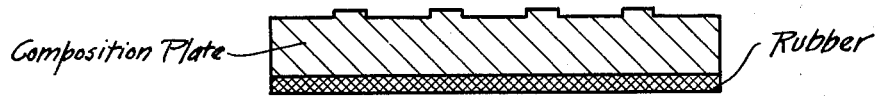
Figure 2:
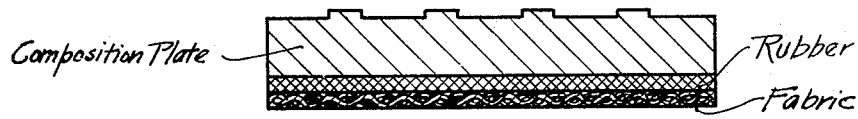
Fig. 2 shows a similar plate with a backing of rubber reinforced by fabric.
Figure 3:
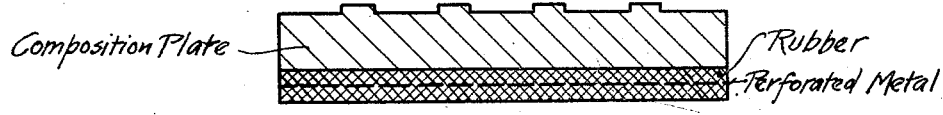
Fig. 3 shows a plate with a backing of rubber reinforced by a perforated metal plate.
Figure 4:
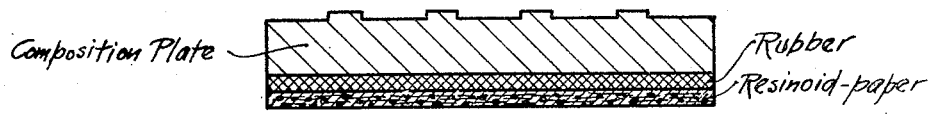
Fig. 4 shows a plate with a backing of rubber reinforced with a resinoid-impregnated paper sheet.

In the practice of this invention the reactive resinoid composition is applied to the matrix preferably in the form of a sheet and the rubber backing is placed thereon. A thickness of rubber found suitable is about $\frac{1}{32}$ to $\frac{1}{16}$ of an inch or more. The backing can be plain rubber Fig. 1 or rubber reinforced with fabric Fig. 2, with woven or perforated metal Fig. 3 or with resinoid-impregnated paper or other sheet material Fig. 4. The assembly is then submitted to heat and pressure as above. The molded plate is preferably cooled while in the press; but it can be discharged hot, particularly if the plate is thereupon curved for rotary press use.

In the molding operation the unexpected effect is found that accurate reproduction in the printing plate is obtained with less pressures than those hitherto required. Furthermore there is a conspicuous absence of low spots or valleys in the surface which are likely to be present under the prior practice. These unexpected results may be ascribed to the restriction that the rubber sheet material imposes against lateral flow of the resinoid material and thereby promotes the perpendicular flow into the depressions of the matrix surface.

The resiliency that is imparted to printing plates by the addition of a rubber backing adapt them to a wider variety of uses than has hitherto been possible. For instance they can be more readily curved, without distortion for use on rotary presses; the curving of the plates is accomplished while still hot, following discharge from the press or a flat cold plate can be reheated and curved while warm. It is also found that less overlay with certain types of printed matter is necessary than has hitherto been required; in fact it is found that a resinoid plate provided with a rubber backing may under suitable conditions produce good prints without any overlay whatever. In addition the rubber backing forms a convenient means for cementing printing plates to wooden blocks or other suitable material with the result that a flatter and more permanent printing surface is secured with no danger of loosening from wood blocking.

A further surprising advantage following the use of rubber backing is the relative flatness of the resulting plates. It is a general experience that when a resinoid composition is molded onto a sheet or layer of a dissimilar material, such as wood, fibre or a previously cured laminated resinoid and paper sheet, warping occurs. The rubber backing, however, appears to be an exception to this rule.

The invention has herein been specifically described as applied to the manufacture of printing plates. It is, however, adapted to other applications, such as the large variety of uses to which laminated sheet materials lend themselves, including table tops, paneling, etc. The invention therefore is not to be narrowly construed but to be given a scope commensurate with the appended claims.

We claim:

1. A printing plate having a printing face portion prepared from a phenolic resinoid composition and a backing of resilient material.

2. A printing plate having a printing face portion prepared from a phenolic resinoid composition and a backing comprising rubber.

3. A method of preparing molded articles which comprises applying a reactive resinoid composition to a matrix, superposing on said composition a resilient material in sheet form, and applying heat and pressure to force the resinoid into contact with the matrix and transform the resinoid to the infusible condition.

4. A method of preparing molded articles which comprises placing a reactive resinoid composition over a matrix, superposing on said composition a backing which is substantially impervious to the composition but adheres thereto, and applying heat and pressure to mold the composition into conformity with the matrix.

5. A method of preparing curved plates which comprises molding a resilient backing to a resinoid composition in the flat condition and thereafter curving the plate while in a heated condition.

6. A printing plate having a printing face portion prepared from a phenolic resinoid composition and a backing of resilient material adherent to but substantially unpenetrated by said face portion.

7. As an article of manufacture a product comprising a surface portion of molded phenolic resinoid composition and a sub-surface portion of a resilient material.

8. As an article of manufacture a product comprising a surface portion of molded phenolic resinoid composition and a sub-surface portion containing rubber.

In testimony whereof, we affix our signatures.

HYLTON SWAN.
SIGFRIED HIGGINS.